(12) United States Patent
Chang

(10) Patent No.: US 7,733,129 B2
(45) Date of Patent: Jun. 8, 2010

(54) METHOD AND CIRCUIT FOR GENERATING MEMORY CLOCK SIGNAL

(75) Inventor: Chi Chang, Taipei (TW)

(73) Assignee: Via Technologies, Inc., Taipei (TW)

( * ) Notice: Subject to any disclaimer, the term of this patent is extended or adjusted under 35 U.S.C. 154(b) by 13 days.

(21) Appl. No.: 12/167,797

(22) Filed: Jul. 3, 2008

(65) Prior Publication Data

US 2009/0039941 A1 Feb. 12, 2009

(30) Foreign Application Priority Data

Aug. 7, 2007 (TW) .............................. 96129050 A (51) Int. Cl.
*H03K 19/00* (2006.01)

(52) U.S. Cl. ..................... 326/93; 327/141; 327/161; 327/291; 327/299

(58) Field of Classification Search ................ 326/93, 326/95–99; 327/141, 144, 145, 161, 291, 327/293, 294, 298, 299; 713/500, 501, 503; 365/233

See application file for complete search history.

(56) References Cited

U.S. PATENT DOCUMENTS

| 6,550,013 | B1 * | 4/2003 | Gervais et al. | 713/501 |
| 2004/0236977 | A1 * | 11/2004 | Kizer et al. | 713/500 |
| 2007/0030754 | A1 * | 2/2007 | Gomm | 365/233 |
| 2008/0115005 | A1 * | 5/2008 | Kamada | 713/501 |
| 2008/0238483 | A1 * | 10/2008 | Tamlyn | 326/93 |

FOREIGN PATENT DOCUMENTS

JP 2008122159 A * 5/2008

\* cited by examiner

*Primary Examiner*—Lincoln Donovan
*Assistant Examiner*—Shikha Goyal
(74) *Attorney, Agent, or Firm*—Kirton & McConkie; Evan R. Witt (57) ABSTRACT

A memory clock signal is generated in response to a reference clock signal and a clock enable signal. The memory clock signal with a frequency identical to that of the reference clock signal is generated during the clock enable signal is in an enabled state; and the memory clock signal with a reduced frequency is generated when the clock enable signal is changed from the enabled state to a disabled state. The generation of a memory clock signal is adaptive so as to save power.

14 Claims, 6 Drawing Sheets

FIG.5

METHOD AND CIRCUIT FOR GENERATING MEMORY CLOCK SIGNAL

FIELD OF THE INVENTION

The present invention relates to a method and a circuit for generating a memory clock signal, and more particularly to a method and a circuit for generating a memory clock signal for updating the clock signal of a system memory.

BACKGROUND OF THE INVENTION

A common architecture of motherboards for use in commercially available computer systems includes a central processing unit (CPU), a chipset and some peripheral circuitry. CPU is a core of a computer system for executing a variety of logic operations and dominating operations of the entire system. A chipset is a bridge for coordinating the CPU and a number of peripheral devices, and typically but not necessarily includes a north bridge (NB) chip and a south bridge (SB) chip.

Another essential device included in a motherboard is a system memory which is generally implemented with a dynamic random access memory (DRAM). A system memory is generally in direct communication with the NB chip. Depending on various reading/writing specifications, currently available system memories include Synchronous DRAM (SDRAM), Double Date Rate SDRAM (DDR SDRAM), etc.

SUMMARY OF THE INVENTION

The present invention provides a method of generating a memory clock signal in response to a reference clock signal and a clock enable signal. The memory clock signal with a frequency identical to that of the reference clock signal is generated during the clock enable signal is in an enabled state; and the memory clock signal with a reduced frequency is generated when the clock enable signal is changed from the enabled state to a disabled state.

The present invention provides a circuit and a method for generating a memory clock signal, wherein a clock generator generates a delayed clock enable signal according to a reference clock signal and a clock enable signal; a delay circuit is coupled to the clock generator and generates a clock cycle selection signal according to an inverted reference clock signal and the delayed clock enable signal; and a gating circuit is coupled to the clock generator and the delay circuit and generates a gated memory clock signal according to the reference clock signal, the delayed clock enable signal and the clock cycle selection signal.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
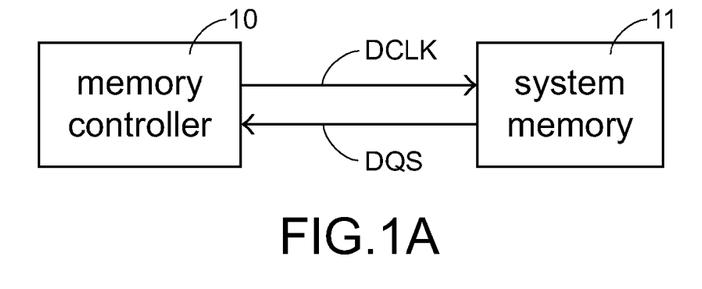
FIG. 1A is a block diagram illustrating the control of a system memory by a memory controller according to prior art.

Please refer to FIG. 1A, which illustrates operations of a system memory. The system memory 11 is controlled by a memory controller 10. Any data associated with signals or commands to be processed or executed by the CPU of a computer system need to be temporarily stored in specified storage space in the system memory 11. The memory controller 10 thus controls the access to (including reading from and writing into) the system memory 11, and also the power refreshment of the system memory 11.

As is understood, all the access actions to the system memory 10 should be executed in response to a memory clock signal DCLK. The memory clock signal DCLK is generally provided by the memory controller 11 according to a reference clock signal (not shown) and has the same phase and frequency as the reference clock signal. Then a delay-locked loop (DLL) circuit (not shown) of the system memory processes the memory clock signal DCLK with a synchronization operation so as to generate a data strobe signal DQS. The data strobe signal DQS is then transmitted back to the memory controller 10 along with data. In this way, a bridge chip (not shown) may access data from the system memory 11 in response to the data strobe signal DQS.

The synchronization operation described above is a process of detection and calibration performed by delaying input and/or output to make the phase of the resulting data strobe signal DQS consistent with that of the memory clock signal DCLK, i.e. in phase. Furthermore, compensation of the memory clock signal is continuously performed by the DLL circuit during data access in order to offset any phase skew of the data strobe signal DQS, which might occur due to thermal or voltage variation of associated devices.

Figure 1B:
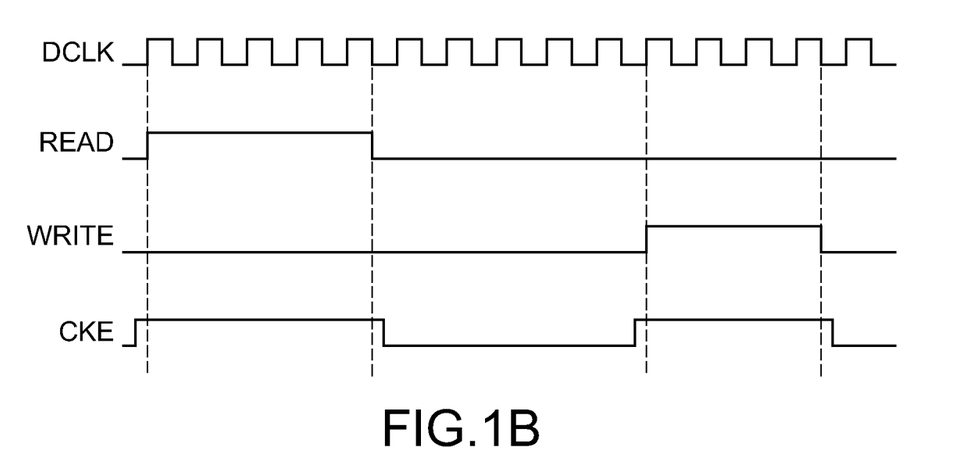
FIG. 1B is a time sequence schematically showing logic states of a clock enable signal according to prior art.

FIG. 1B illustrates the data access time sequence. As shown, when a read signal READ or a write signal WRITE is at a high level to indicate a data access state, the memory controller 10 pulls a clock enable signal CKE high to enable data reading from or data writing to the system memory 11. On the other hand, the clock enable signal CKE is pulled low when there is no data access occurring, i.e. both the read signal READ and write signal WRITE are at low levels.

It can be seen from FIG. 1B that the memory clock signal DCLK is continuously outputted from the memory controller 10 to the system memory 11 with a constant toggle rate in order to precisely obtain the corresponding data strobe signal DQS. Even when data access is not performed and thus the data strobe signal DQS is not required, the transmission of the memory clock signal DCLK is still on-going. Therefore, unnecessary power consumption is made. On the other hand, if the generation of the data strobe signal DQS is suspended to save power, the in-phase synchronization of the data strobe signal DQS with the memory clock signal DCLK need be re-executed when the data access to the system memory 11 is required again. Since the synchronization takes time, the data access efficiency is adversely affected.

Figure 2A:
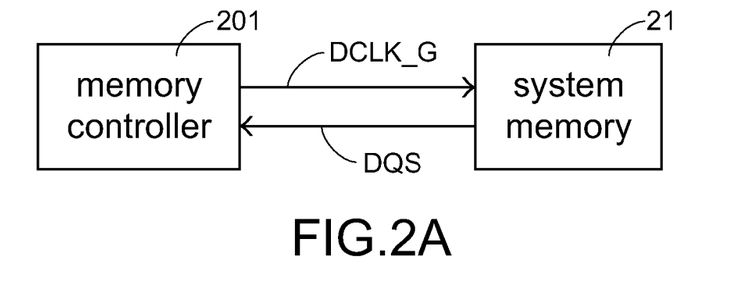
FIG. 2A is a block diagram illustrating the generation of a memory clock signal required by a system memory according to an embodiment of the present invention.

For achieving the object of minimizing power consumption while maintaining the data access efficiency, a memory clock signal is adaptively generated by a memory controller depending on an access state to a system memory according to an embodiment of the present invention. In this embodiment, as shown in FIG. 2A, the memory controller 201 outputs a gated memory clock signal DCLK_G to the system memory 21 for triggering the generation and returning of a data strobe signal DQS. Meanwhile, the memory controller 201 issues a data access command to access to the system memory 21 in response to the data strobe signal DQS.

Figure 2B:
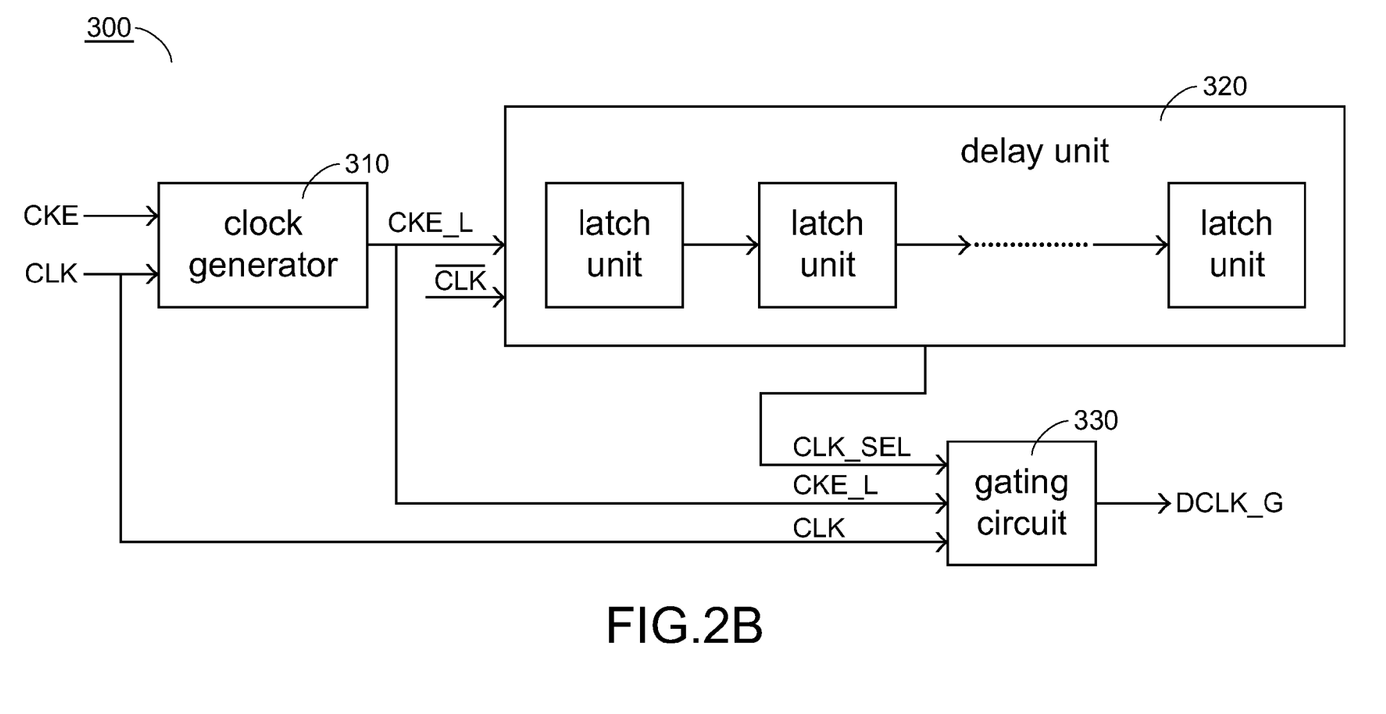
FIG. 2B is a block diagram illustrating a circuit for generating a memory clock signal according to an embodiment of the present invention, which is applicable to the system of FIG. 2A.

In an embodiment, the gated memory clock signal DCLK_G is generated by a memory clock generating circuit 300 disposed in the memory controller 201 and illustrated in FIG. 2B. The memory clock generating circuit 300 includes a clock generator 310, a delay circuit 320 and a gating circuit 330. The clock generator 310 receives a reference clock signal CLK and a clock enable signal CKE and generates a delayed clock enable signal CKE_L. The delay circuit 320 receives the delayed clock enable signal CKE_L and an inverted reference clock signal $\overline{\text{CLK}}$ and generates a clock cycle selection signal CLK_SEL. The gating circuit 330 receives the clock cycle selection signal CLK_SEL, the reference clock signal CLK and the delayed clock enable signal CKE_L and generates the gated memory clock signal DCLK_G. The time sequence of FIG. 3 illustrates the output of the gated memory clock signal DCLK_G in response to the reference clock signal CLK and the clock enable signal CKE.

Figure 3:
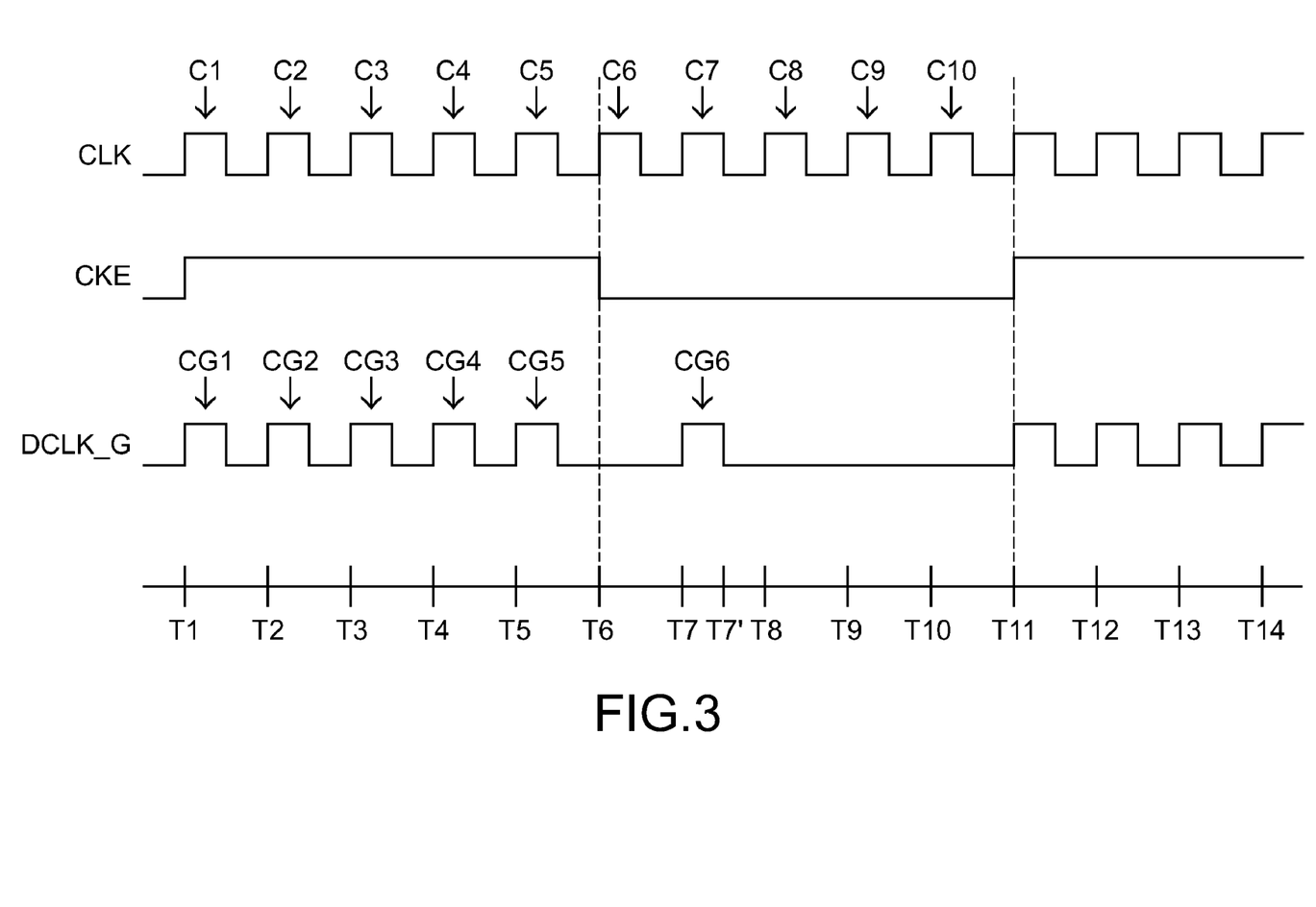
FIG. 3 is a time sequence plot schematically showing a method for generating a memory clock signal according to an embodiment of the present invention.

The gated memory clock signal DCLK_G, just like the conventional memory clock signal DCLK, is continuously transmitted to the system memory 21 in response to the reference clock signal CLK, as shown in FIG. 3, but has an adaptive frequency varying with the logic state of the clock enable signal CKE. When data access is to be performed, the clock enable signal CKE is pulled high to enable data reading from or data writing to the system memory 21. Otherwise, the clock enable signal CKE is pulled low to the disable the data access to the system memory 21. Therefore, the gated memory clock signal DCLK_G has a relatively high frequency during the period the clock enable signal CKE is kept high while has a relatively low frequency during the period the clock enable signal CKE is kept low. In this manner, power consumption to a certain extent can be achieved when no data access is to be performed or during power refreshment. Furthermore, since the gated memory clock signal DCLK_G has never been suspended, it is not necessary to start over the synchronization of the data strobe signal DQS with the gated memory clock signal DCLK_G. The data access efficiency can thus be maintained. It is to be noted that the phase of the gated memory clock signal DCLK_G should be locked regardless of the frequency change to assure of the normal data strobe signal DQS and thus avoid data errors.

For example, referring to FIG. 3 again, the phase and the frequency of the gated memory clock signal DCLK_G are identical to those of the reference clock signal CLK (see the pulses CG1~CG5 generated at cycles T1~T6, respectively, which are synchronous with the clock pulses C1~C5) when the clock enable signal CKE is "high". On the other hand, the frequency of the gated memory clock signal DCLK_G is reduced when the clock enable signal CKE is changed to "low" (see the pulse CG6 generated at cycle T7, which is aligned with the clock pulse C6 instead of C5). However, the pulse CG6 is till kept in phase with the reference clock signal CLK, i.e. the same rising edge at T7 and the same falling edge at T7'. Afterwards, when the clock enable signal CKE is changed to "high" again, the frequency of the gated memory clock signal DCLK_G is restored to a high value. The frequency reduction level of the gated memory clock signal DCLK_G is adjustable according to practical requirements to obtain a good balance between the power saving effect and the data access efficiency.

The details of the operations of the clock generator 310, delay circuit 320 and gating circuit 330 will be described hereinafter with reference to FIGS. 4A~4C.

Figure 4A:
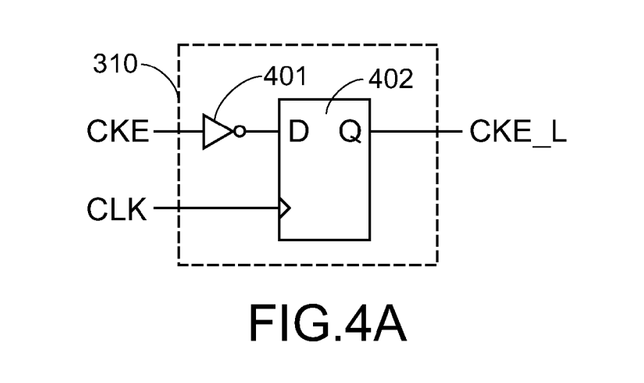
FIG. 4A is a circuit diagram illustrating an embodiment of a clock generator applicable to the circuit of FIG. 2B.

The clock generator 310, for example, may include an inverter 401 and a D flip-flop 402, as shown in FIG. 4A. The D flip-flop 402 receives the inverted clock enable signal CKE as the D input and outputs the delayed clock enable signal CKE_L as the Q output in response to the reference clock signal CLK, e.g. triggered by the rising edges. The delayed clock enable signal CKE_L is then transmitted to the delay circuit 320, which includes a series of latch units. The number of the latch units is variable depending on the desired frequency reduction level. In the example of FIG. 4B, five latch units 321~325 are included so that the frequency of the gated memory clock signal DCLK_G can be reduced down to ⅕ when the clock enable signal is in the disabled state. The latch units 321~325 form a loop. In other words, the output of each latch unit is transmitted to next latch unit and the output of the last latch unit is fed back to the first latch unit. The clock cycle selection signal CLK_SEL is outputted from the second latch unit 322. The resulting time sequence of the associated signals is shown in FIG. 3, wherein the only pulse CG6 generated within the data-access-disabled period is outputted at the second cycle. It is understood the clock cycle selection signal CLK_SEL can also be outputted from another latch unit so as to adjust the output pulse of the gated memory clock signal DCLK_G.

Each of the latch units 321~325 is implemented with a multiplexer 411~415 and a D flip-flop 421~425. The D flip-flops 421~425, for example, are triggered by rising edges of the inverted reference clock signal $\overline{\text{CLK}}$. The D input of the first D flip-flop 421 is an output of the multiplexer 411, which is selected from a high logic state, i.e. "1", and an output LO5 of the last latch unit 325 according to the delayed clock enable signal CKE_L, so as to obtain an output LO1 of the D flip-flop 421. The D input of the second D flip-flop 422 is an output of the multiplexer 412, which is selected from a low logic state, i.e. "0", and an output LO1 of the first latch unit 321 according to the delayed clock enable signal CKE_L, so as to obtain an output LO2 of the D flip-flop 422. Outputs LO3, LO4 and LO5 can be obtained in similar ways. In brief, outputs of the D flip-flops are selected according to the delayed clock enable signal CKE_L and serve as D inputs of D flip-flops of next stages, thereby obtaining outputs LO1~LO5 which are either logic "0" or logic "1".

Figure 4B:
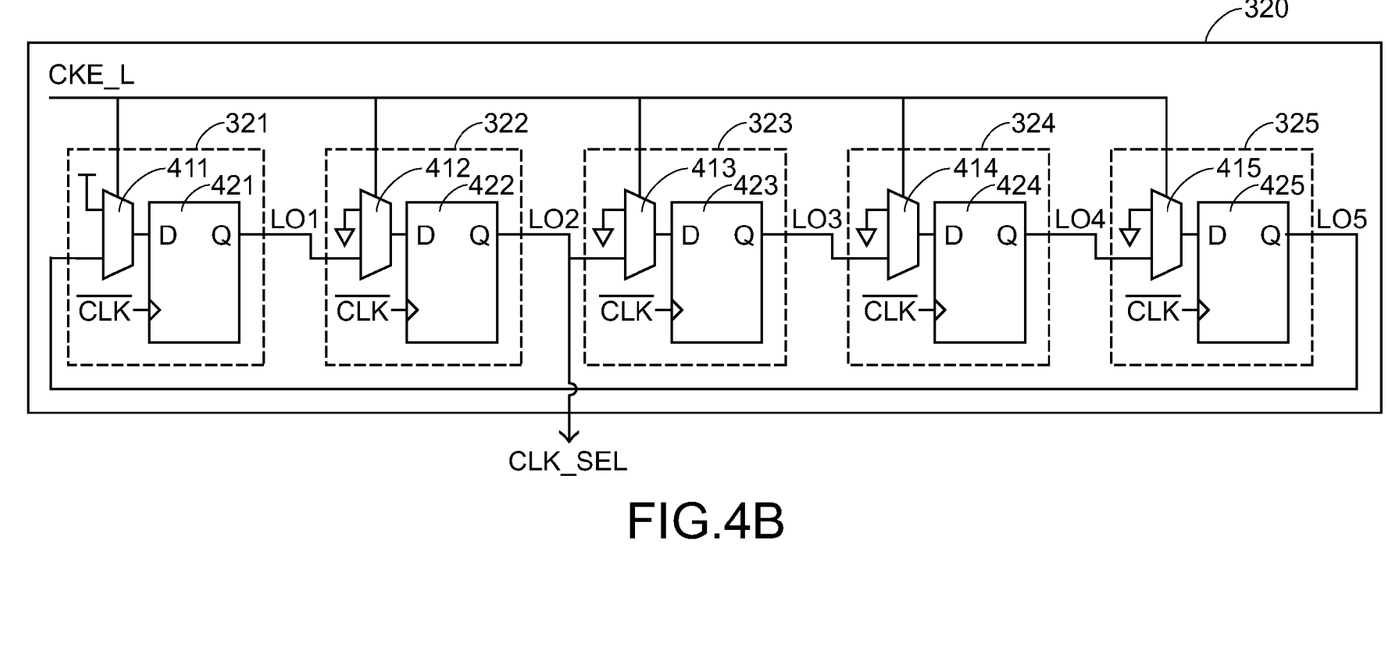
FIG. 4B is a circuit diagram illustrating an embodiment of a delay circuit applicable to the circuit of FIG. 2B.
Figure 4C:
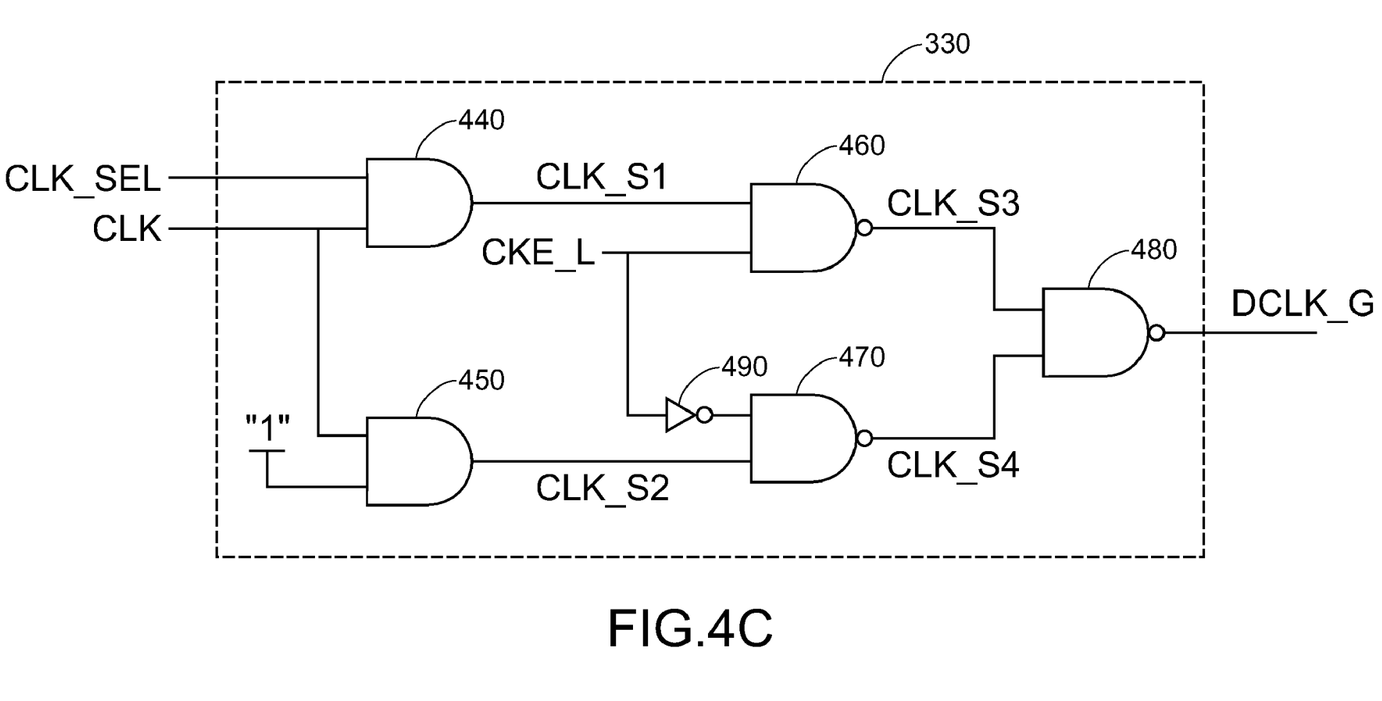
FIG. 4C is a circuit diagram illustrating an embodiment of a gating circuit applicable to the circuit of FIG. 2B.

The gating circuit 330, as shown in FIG. 4C, includes a first AND gate 440, a second AND gate 450, a first NAND gate 460, a second NAND gate 470, a third NAND gate 480 and an inverter 490. The first AND gate 440 receives the clock cycle selection signal CLK_SEL and the reference clock signal CLK and executes a logic operation to output a first signal CLK_S1. The second AND gate 450 having one end coupled to a high level, i.e. logic "1", and the other end coupled to the reference clock signal CLK, and executes a logic operation to output a second signal CLK_S2. The first NAND gate 460 receives the first signal CLK_S1 and the delayed clock enable signal CKE_L outputted by the clock generator 310 and executes a logic operation to output a third signal CLK_S3. The second NAND gate 470 receives the second signal CLK_S2 and an inverted delayed clock enable signal $\overline{CLK\_L}$ obtained by inverting the delayed clock enable signal CKE_L through the inverter 490 and executes a logic operation to output a fourth signal CLK_S4. Subsequently, the third NAND gate 480 receives the third signal CLK_S3 and the fourth signal CLK_S4 and executes a logic operation to output the gated memory clock signal DCLK_G.

Figure 5:
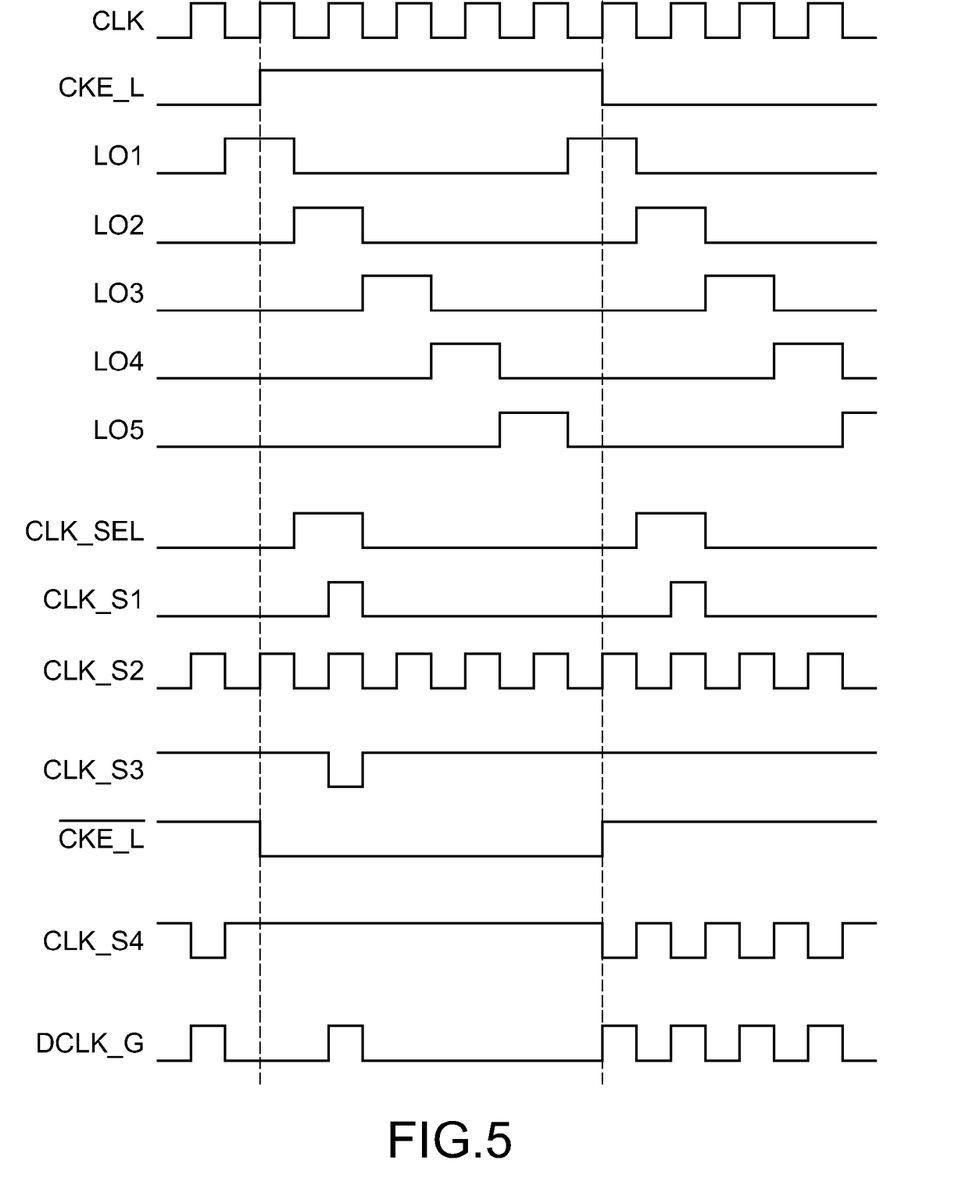
FIG. 5 is time sequence plot schematically showing logic states and logic operations of associated signals by way of the circuits of FIG. 4A~FIG. 4C.

FIG. 5 shows time sequences of associated signals based on the embodiments and examples illustrated in FIGS. 4A~4C. The outputs LO1~LO5 of the five latch units vary with time and are presented in the following in five continuous cycles:

[LO1, LO2, LO3, LO4, LO5]=[1, 0, 0, 0, 0];
[LO1, LO2, LO3, LO4, LO5]=[0, 1, 0, 0, 0];
[LO1, LO2, LO3, LO4, LO5]=[0, 0, 1, 0, 0];
[LO1, LO2, LO3, LO4, LO5]=[0, 0, 0, 1, 0]; and
[LO1, LO2, LO3, LO4, LO5]=[0, 0, 0, 0, 1].

It can be seen from FIG. 5 that the resulting gated memory clock signal DCLK_G complies with the requirement of adaptive frequency.

It is to be noted that the possible delay effect resulting from the logic gates is not taken into consideration of the time sequences, but can be corrected by adding proper delay means in the memory clock generating circuit 300. Since the design of delay means is known to those skilled in the art, it is not to be redundantly described herein.

According to a currently adopted memory clock specification, the low-level duration of the clock enable signal, define a non-data-access period, should not be less than three clock cycles. Therefore, the number of the serially connected latch units included in the delay circuit is supposed to be more than three. The low-level duration of the clock enable signal can be longer than three cycles, which then requires a longer latch unit loop.

A low-level clock enable signal, in addition to indicating a non-data-access status, may also indicate a power refreshment status of the system memory. The clock pulse rate during power refreshment can also be reduced in the above-described manner to save power.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of generating a memory clock signal for a memory in response to a reference clock signal and a clock enable signal, comprising:
generating the memory clock signal with a frequency identical to that of the reference clock signal during an enabled state of the clock enable signal when data access to the memory is performed; and
generating the memory clock signal with a reduced frequency when the clock enable signal is changed from the enabled state to a disabled state when no data access to the memory occurs.

2. The method according to claim 1 wherein the memory clock signal is always kept in phase with the reference clock signal.

3. The method according to claim 1 wherein the memory clock signal is provided for a system memory of a computer system.

4. The method according to claim 1 wherein the enabled state of the clock enable signal is indicated within a data-access period, and the disabled state of the clock enable signal is indicated within a non-data-access period or power refreshment period.

5. A circuit for generating a memory clock signal for a memory, comprising:
a clock generator generating a delayed clock enable signal according to a reference clock signal and a clock enable signal which is in an enabled state when data access to the memory is performed;
a delay circuit coupled to the clock generator and including a series of interconnected latch units for generating a clock cycle selection signal according to an inverted reference clock signal having a phase inverse to the reference clock signal and the delayed clock enable signal; and
a gating circuit coupled to the clock generator and the delay circuit for generating a gated memory clock signal according to the reference clock signal, the delayed clock enable signal and the clock cycle selection signal.

6. The circuit according to claim 5 wherein the frequency and phase of the gated memory clock signal are the same as those of the reference clock signal during the enabled state of the clock enable signal.

7. The circuit according to claim 5 wherein the gated memory clock signal has a frequency different from that of the reference clock signal but is in phase with the reference clock signal during the enabled state of the clock enable signal.

8. The circuit according to claim 7 wherein the frequency of the gated memory clock signal is lower than that of the reference clock signal during the disabled state of the clock enable signal.

9. The circuit according to claim 5 wherein the clock generator includes:
an inverter for inputting therein and inverting the clock enable signal to output an inverted clock enable signal; and
a D flip-flop coupled to the inverter, receiving the inverted clock enable signal from a D input and outputting the delayed clock enable signal from a Q input in response to the reference clock signal.

10. The circuit according to claim 5 wherein the reduced frequency is variable with a number of the latch units included in the delay circuit.

11. The circuit according to claim 5 wherein each of the latch units includes:
a multiplexer; and
a D flip-flop coupled to the multiplexer for outputting a logic value "0" or logic "1" in response to the inverted reference clock signal;
wherein an output signal of one of the latch units is selected as the clock cycle selection signal.

12. The circuit according to claim 5 wherein the gating circuit includes:

a first AND gate for operating the clock cycle selection signal and the reference clock signal to output a first signal;

a second AND gate for operating the reference clock signal and a logic value "1" to output a second signal;

a first NAND gate coupled to the first AND gate for operating the first signal and the delayed clock enable signal to output a third signal;

a second NAND gate coupled to the second AND gate for operating the second signal and an inverted delayed clock enable signal to output a fourth signal; and a third NAND gate coupled to the first NAND gate and the second NAND gate for operating the third signal and the fourth signal to output the gated memory clock signal.

13. The circuit according to claim 12 wherein the gating circuit further includes an inverter for inverting the delayed clock enable signal into the inverted delayed clock enable signal.

14. A circuit for generating a memory clock signal for a memory, comprising:

a clock generator generating a delayed clock enable signal according to a reference clock signal and a clock enable signal which is in an enabled state when data access to the memory is performed;

a delay circuit coupled to the clock generator and including a series of interconnected latch units for generating a clock cycle selection signal according to an inverted reference clock signal having a phase inverse to the reference clock signal and the delayed clock enable signal; and a gating circuit coupled to the clock generator and the delay circuit for generating a gated memory clock signal according to the reference clock signal, the delayed clock enable signal and the clock cycle selection signal;

wherein the gating circuit includes:

a first AND gate for operating the clock cycle selection signal and the reference clock signal to output a first signal;

a second AND gate for operating the reference clock signal and a logic value "1" to output a second signal;

a first NAND gate coupled to the first AND gate for operating the first signal and the delayed clock enable signal to output a third signal;

a second NAND gate coupled to the second AND gate for operating the second signal and an inverted delayed clock enable signal to output a fourth signal; and a third NAND gate coupled to the first NAND gate and the second NAND gate for operating the third signal and the fourth signal to output the gated memory clock signal.

* * * * *